Patented July 11, 1944

2,353,333

UNITED STATES PATENT OFFICE 2,353,333

FOOD PRODUCT

Samuel B. Harris, Cristobal, C. Z.

No Drawing. Application September 3, 1940,
Serial No. 355,233

8 Claims. (Cl. 99—204)

This invention relates to food products and more particularly to dried banana products and the method of preparing and preserving the same as an edible and palatable nutritious food.

One of the important features of the present invention is to provide novel banana food products and processes of preparing and preserving the same so that the banana shall retain a pleasing appearance and physical state, as well as retain the valuable food and nutritive elements usually present and well known in bananas.

Another object of the invention is to provide a novel method of processing banana products in order that the banana shall acquire additional flavors, food values, and facilities for useful combinations with other goods and nutritious confections.

Another object of the invention is to provide a novel process of preparing an edible dried banana food product which shall retain the original shape and appearance of the banana.

Another object of the invention is to provide a novel process of treating whole ripe bananas so that the resulting product may be utilized in mass or liquid form for constituent parts of other food substances and products.

A further object of the invention is to provide novel forms of banana substances for use in confection products.

These and other objects of the invention will be more manifest from the following specification and particularly set forth in the claims.

One of the important problems in the present day banana industry, or market where bananas are grown and shipped, is to take care of the waste occasioned by the mistakes, accidents, market changes and rapid ripening of the fruit. This is especially true of those bananas which do not pass inspection for transportation for any of these causes, and so are rejected for commercial shipment.

As bananas in international commerce generally change from one carrier to another at different points, there is always a proportion that are ripening too rapidly to permit further handling at each of these points, and it is desirable to process the ripened bananas at such points and places of transfer and thus reduce final wastage to a minimum.

Heretofore this wastage of bananas has been enormous and owing to the climatic conditions existing in tropical countries where bananas are grown, these ripe bananas have been allowed to go to waste because no conveniently practicable means has been devised for taking care of this waste product.

I have discovered that a ripe banana may be readily preserved as a food product by treating the same in accordance with my novel process.

This process includes the primary steps of first peeling the ripe banana and then immediately treating the same to a heated, acidulated solution and then subsequently drying the banana.

In case it is desired to produce products of the same nutritive value, but of different forms and consistency, the ripe bananas may be passed through rolls which reduce the entire fruit to a pulp, or if desired, the entire fruit may be passed through a mill which grinds the skin and pulp together, and in either case the skin is readily removed by straining or by sedimentation. Another form of treatment of the whole banana may include that the skins shall first be removed and ground separately. In either case, it is possible to obtain from the skin, by the same acidulating process which is the basis of this improvement, a product having a new and attractive flavor, which may or may not be incorporated with either of the other forms of banana food products hereinafter described.

The acidulated solution may include such acids as tartaric, phosphoric, acetic, citric, hydrochloric, or other acid solutions.

In the preferred embodiment of the invention, a ripe banana is peeled and then treated in a heated, acidulated solution before the banana pulp has had an opportunity to be oxidized or discolored or otherwise deteriorated by atmospheric or climatic conditions. The acidulated treatment may consist of completely coating the peeled banana by spraying, immersing, or dipping the banana in a heated acidulated solution, or the pulp may be reduced to a mass either with or without the skins which may also be ground or left entire during the first part of the process and later removed by straining or sedimentation. Whichever method is employed, it is essential that the product be heated to a predetermined degree, and this temperature is best determined by the ripeness of the banana and the length of time which the product is treated may vary with the size of the fruits or method used, or in other words the physical condition of the banana pulp at the time of treatment.

The preparatory heating is best accomplished by placing the banana in a heated acidulated solution. Whichever form is employed, it is important that the temperature shall not be raised above the boiling point or to such a temperature and for such a period as will deteriorate the banana pulp.

One of the important features of the present invention is to regulate the heat so that during the several treatment steps the pleasing physical appearance and color of the banana is not changed, thereby producing a readily saleable and useable product, and one which may be conveniently stored or transported, as desired.

Another feature to be observed in the heat treatment is that the heating must be carried on for a sufficient length of time to permit the acid to penetrate the banana pulp and at the same time not deteriorate or discolor the pulp while it performs the important function of checking or preventing oxidation. It is generally believed that the seed portion of the banana contains anacrolitic acid and tannin, and it is generally understood that the combination or reaction of these two chemicals causes the rapid deterioration, discoloration and loss of taste and food value of the dried banana when it is subjected to a tropical climate for any length of time. I have discovered that by treating the banana to an acidulated solution under the regulated heat conditions specified, that the acid penetrates the banana pulp without destroying the physical properties and effectively prevents the destructive chemical reaction produced by the combination of anacrolitic acid and tannin, and develops a state or principle which not only makes the fruit less hygroscopic, but prevents the attacks of many of the usual molds, mycelia, bacteria and insects which ordinarily cause such rapid destruction of this food.

I have also discovered that a banana product treated with an acidulated solution in accordance with my invention provides a novel substance which is very desirable and useful in the human and animal digestive systems. In fact this product is antiseptic in character when used or taken as a food and, therefore, aids digestion in this manner.

The heating of the banana in the acidulated solution has the advantages that penetration of acid is commenced as soon as possible after removing the peeling, and thereby reducing oxidation to a minimum. It is well known that the pulp of a dried banana is very hygroscopic. If the action of the solution in which the banana is treated continues for any appreciable length of time, near the boiling point, the food value is lessened and physical deterioration of the banana product results.

In carrying out my novel process, it has been discovered that the banana can best be physically preserved by treating the pulp in a heated acidulated solution until the acid has penetrated a considerable part of the pulp and then the banana is immediately subjected to a drying atmosphere. The acid immediately acts on the outer part of the pulp and the continued application of heat dries the outside pulp portion while the heat is still driving the acid into the core portion of the banana to prevent the destructive reaction resulting from the combination of anacrolitic acid and tannin and also retards the oxidation and absorption of moisture from the air. Furthermore, by regulating the temperature and actual acidity of the acid treating solution and the drying temperature, I am able to produce a product having a most pleasing appearance and at the same time greatly vary the flavor and consistency of the dried banana food product to adapt it to many uses and tastes.

I have further discovered that an edible and very palatable banana confection may be made in accordance with the above process by the addition of a coating including fruit juice or other flavors with coloring matter and powdered milk, vegetable gums, the usual forms of starch, or glucose.

In this case, as heretofore pointed out, the banana is treated in the acidulated solution and then the coating compounds are added prior to the drying process to form a shell-like surface. It may be desirable to coat the banana after drying because of the shrinkage in size which may occur after dehydrating the product, either in its original shape or when used in bulk or small masses. When the original shape of dried banana food product is desired, it is essential that the pulp and core of the banana be treated with the acid in a manner which shall not destroy the physical characteristic of the whole banana.

In some cases it is desired to dry the banana in individual molds of the same configuration as a banana, which is practical even after having reduced the pulp to a mass by grinding before the acidulation process step. These molds must preferably be of heat-conducting and acid resistant material.

One important feature of commencing the drying operation immediately after the acid treatment operation is appreciable saving of time and heat energy. The fact that the acid penetration into the banana pulp must be comparatively slow to avoid deterioration and destruction of the banana makes it essential to combine the two steps of the process to make the desired saleable product as well as rendering the process commercially practical from an economic standpoint.

One commercial advantage of making the dried banana into a confection product is that when the banana pulp is treated with the acidulated solution, the gummy and tacky consistency of the pulp is completely altered so that the drying process is much more rapid, requires less heat, and the resulting product is much more acceptable. This facilitates the handling of the product and makes it more pleasing in the mouth, as well as facilitating the combination with other food substances in manufacturing processes. Furthermore, when the outer surface is coated, it is not necessary to observe such great care in the heat treatment of the banana to preserve the physical characteristics.

For example, after the banana is externally treated by the heated acidulated solution, the chemical reaction or penetration into the pulp and core continues for several hours. Therefore, after starting the chemical action in the banana pulp the drying operation may be immediately started, and by the time that the acid has reached the core of the banana, the banana has been dried to the desired state of firmness or hardness. The banana product in this state of preservation is ready for further use as a food or in proper condition for packing and shipping, irrespective of any climatic or weather conditions.

It has also been proved that this process is practical with many of the forms and varieties of the musa family besides the usual banana of commerce. This applies especially to the variety known as Bungalan, which is a superior food and resists the destructive enemy of the banana growing business known as the Panama disease. The Bungalan is a more productive variety of fruit, but on account of the fact that it ripens too quickly after removing from the plant to permit long transportation, it has not often reached commercial international markets. This process also permits the variety of fruit known as plantains to be kept indefinitely and transported to any market where they are much needed on account of their very high food value.

Having thus described a novel method of making a banana product or confection, it is obvious that various changes may be made without departing from the scope of the invention as set forth in the appended claims.

In the claims:

1. The method of making a banana product which consists in treating the outer surface of a ripened banana fruit substance with an acidulated solution without materially altering the pulp consistency and then immediately subjecting the treated fruit to a drying atmosphere while the acid solution penetrates the core of the banana and the banana is being dried to a desired firmness.

2. The method of making a banana product which consists in crushing whole ripened bananas into a soft mass, treating the mass to a heated acidulated solution without materially altering the pulp consistency and then immediately subjecting the mass to a heated atmosphere while the acid solution penetrates to the interior of the mass and the mass is being dried to a desired firmness.

3. The method of making a banana product which consists in crushing the core of the banana into a soft mass, immediately treating the mass to a heated acidulated solution to prevent discoloration, molding the mass into a predetermined form, and then subjecting the form to a drying atmosphere until the mass has reached a desired firmness.

4. The method of making a banana food product which consists in peeling a ripe banana, treating the surface of the banana with a heated acidulated solution and then immediately drying the banana in a heated atmosphere while the acid of the solution penetrates the core and the moisture is being extracted from the core.

5. The method of making a dried banana food product which consists in peeling a ripe banana, immediately treating the banana surface with a heated acidulated solution without materially affecting the pulp and then placing the banana in a heating mold and continuing the heating operation until the acid of the solution has penetrated the core of the banana and the banana dried to a desired firmness.

6. The method of making a banana food product which consists in peeling a ripe banana, immediately treating the same in a heated fruit juice acid solution without discoloring the pulp until the acid penetrates the pulp, and then subjecting the banana to a drying atmosphere to preserve the shape thereof and permit the acid to further penetrate the seedy core of the banana and arrest the reaction of anacrolitic acid and tannin constituents of the banana.

7. The method of making a banana food confection product which consists in peeling a ripe banana, treating the surface of the same to a heated acidulated acid solution, removing the banana from the heated acid solution, immediately coating the same with a flavored glucose composition and then subjecting the banana to a further drying operation in an elevated temperature sufficient to cause the acid to penetrate the core of the banana and harden the coating.

8. The method of making a dried banana food product which consists in peeling a ripe banana, immediately treating the banana surface with an acidulated solution at an elevated temperature without deteriorating the banana pulp, and then subjecting the banana to a drying temperature for a sufficient length of time to simultaneously cause the acid to penetrate the banana core and dry the banana to a desired firmness.

SAMUEL B. HARRIS.